United States Patent Office 3,098,425
Patented July 23, 1963

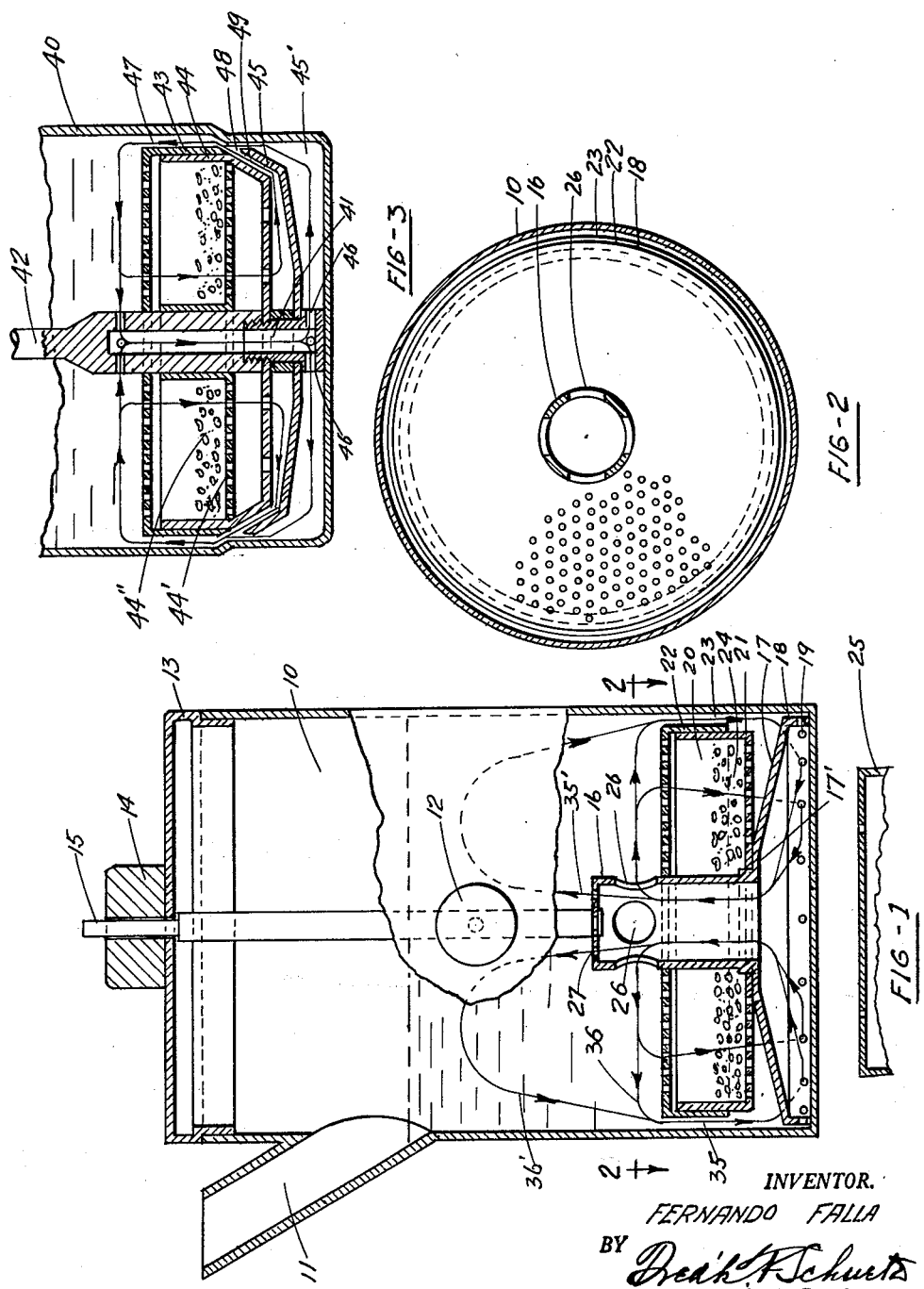

3,098,425
POT FOR BREWING COFFEE AND METHOD OF EFFECTING THE BREWING
Fernando Falla, 59 Elm St., Millburn, N.J.
Filed Apr. 21, 1960, Ser. No. 23,728
8 Claims. (Cl. 99—317)

This invention relates to a novel pot construction whereby the brewing operation may be effectively carried out.

The invention has for an object the provision of a pot for brewing coffee whereby the charge will, at all times, be wholly immersed in the water; and to secure a substantially 100% extraction of the coffee solubles. With existing pots for brewing coffee this has not been the case.

For example, the performance of the well known percolator type is not particularly efficient in that the solubles of the charge are not fully extracted, since only a minor portion of the water is forced into the fresh charge. In accordance with the novel construction of the pot, it has been found that not only is a substantially smaller quantity of the ground charge required; but that during the brewing, the charge and the water are maintained at substantially the same temperature. Furthermore, the circulation established favors a filtering action by the charge. In the case of a drip pot operation, it is to be noted that the heat is applied by pouring hot water over the charge. This result in a cooling of the brew and in complete absorption of solubles.

In accordance with the novel procedure, it has been found that substantially smaller quantities of the ground charge are required and a better control of the temperature of the brew is attained. Also, more coarsely ground beans may be utilized in the brewing conducive to less sediment.

More specifically, the invention involves the confining of a charge of the ground coffee beans with a novel vessel attached to a rod whereby it may readily be deposited within and removed from an otherwise more or less conventional coffee pot—the charge being wholly immersed in the requisite volume of water.

Thereupon, heat is to be applied to the bottom of the pot to induce, in a novel manner, a continuous thermal circulation of the water and eventually through the immersed charge.

The nature of the invention, however, will best be understood when described in connection with the accompanying drawings, in which:

FIG. 1 is a vertical section through the novel coffee pot, with a portion thereof shown in elevation.

FIG. 2 is a horizontal section through the pot, taken on the line 2—2, FIG. 1 of the drawings and looking in the direction of the arrows.

FIG. 3 is a fragmentary vertical section of the lower portion of the novel coffee pot, and illustrates a modification therein.

Referring to the drawings, more particularly to FIGS. 1 and 2, 10 designates a generally cylindrical, open-top container or more or less conventional coffee pot which is provided with the customary spout 11 and handle 12 for manipulation of the pot in dispensing brewed coffee therefrom. A tightly fitting, flanged cover 13, with attached knob 14, is provided also to close the pot. The said knob is bored to receive and position axially of the pot a vertically disposed stem 15. This vertical disposed stem 15 has a smaller diameter through the knob 14 protecting above it, so that cover 13 will maintain rod 15 and lower ground coffee retaining vessel 20 in position. Moreover, there is between cover 13 and larger diameter of stem 15, sufficient play to move up and down rod 15 and ground retaining vessel so as to promote faster and more perfect brewing. The latter, at its inner end, carries ends and serves to position axially the novel coffee brewing unit which comprises a tubular element 16 flaring outwardly at its bottom portion, as is indicated at 17. It is provided, also, with a cylindrical termination 18 which rests on the bottom of the container and is provided with perforations 19 which admit of a return circulation of the coffee brew, as will hereinafter be more fully set forth. Tubular element 16 also projects above cup member 22 to only allow openings 26 to be above upper perforated portion of cup member 22.

Removably supported on a central horizontal portion 17' of the said flaring portion 17 is a ground coffee retaining vessel 20. This consists of two telescoping cup-like portions 21, 22—the latter being inverted and telescoping over the former, with more or less loose fit. The said vessel 20, moreover, is so dimensioned, more especially with reference to its diameter, that there will remain between it and the adjacent wall portion of the pot an annular passageway 23 for circulation of the brew, as will hereinafter be more fully set forth.

Both horizontal portions of 21 and 22 are perforated to a degree such as will not permit the ground coffee particles 24 to pass through; but will allow heated water within the pot to do so.

To secure such heating, the pot is to be associated then with a suitable source of heat, for example, the burner 25, as is well understood. The heating is continued until the desired degree of extraction of coffee is obtained by an insipient boiling.

With the foregoing arrangement, it will be noted that the thermal circulation induced will be upwardly from the bottom of the pot through the tubular element 16, as is indicated by the arrows. There is provided, also, in the said tubular element 16 and beyond the top of the vessel a plurality of radial openings 26 and top openings 27—the area of the former openings being substantially greater than that afforded by the latter ones. Moreover, as the cylindrical vessel 22 is dimensioned so that its diameter is appreciably less than that of the pot 10, the annular passageway 23 therebetween will be of an area substantially less than the total area of the vessel perforations. The greater volume of the extraction water will thus be confined to passage through said charge.

In operating the pot to produce the desired brew, it is required first to remove the cover 13 and then lift out the rod 15 with attached tubular element 16 as well as the telescoped cups 21, 22 so as to allow of placing the roasted, ground coffee beans 24 into the said cup 21. Once the charge is placed therein, a slight agitation manually of the same in a generally horizontal plane will serve to level said charge in the vessel which is then replaced in position for the brewing operation. However, before the cover 13 is relocated, water is introduced to the level required to accommodate the charge.

The range of the capacity of the novel pot is—for a minimum amount of water—the center of the radially disposed openings 26 of tubular element 16; and—for the maximum—a level just below the outlet of the spout 11.

The top openings 27 of the tubular element 16 are for the purpose of directing hot water to the upper part of the container 10 so as to distribute the solubles of the charge to the whole mass of water in said container. In this manner, at the end of the brewing period, the whole beverage will be of uniform color.

Since the greater action of violent boiling and consequent circulation occurs through the openings 26 which discharge radially, the surface level of the water will at all times remain generally undisturbed. No matter how much water is utilized in the container, there will not be any spilling or spouting thereof through the spout 11.

The pot is then ready for the brewing; and it is to this end associated with the heating unit 25, as shown, said unit being of the conventional electric or gas burner type. As the water becomes heated and eventually attains the boiling point, a natural water circulation is established in the tubular element 16—said circulation following, generally, the course indicated by the arrows. That is to say, it flows axially upwardly from the bottom to beyond vessel 22, becoming then divided to flow through the lateral ports 26 into streams indicated in part at 35, 36. A portion thereof, however, continues flowing through the ports 27 to provide upwardly-directed streams 35', 36' which eventually join the aforesaid flows to pass through the vessel and the annular passage between said vessel and the contiguous wall portion of the pot; and finally to the bottom of the pot for re-circulation, as is indicated by the arrows.

It is to be noted that after the heating begins, the normal circulation by the arrows takes place. As this circulation progresses with continued heat application, the mass of coffee grounds gradually become deaerated and soon completely wetted. The solubility of air in water grows rapidly with the raising temperature. The solubility becomes 100% at steam temperature or boiling point. This means that the coffee brew is completed just before the water begins to boil, with the resultant effect that there is no odor of the coffee aroma escaping the pot, all the aroma will be retained in the resultant brew. An important feature of this invention is that for a quick and efficient preparation of the brew, the pot can be readied the night before with warm water from the kitchen tap and the adequate amount of coffee grounds and left on top of the stove all night. Since water circulation is free to move, all the coffee grounds are fully deaerated shortly and the brew partially completed. All is required is, to bring in the morning, the contents of the coffee pot to a boiling point temperature. It is to be noted that during such standing preparation, the air is completely removed from the coffee grounds so that all oxygen is removed while the coffee grounds are submerged. This means no possibility of any oxygen acting to the roasted coffee grounds rendering a perfect lasting flavored brew.

In order to assure perfect control of the various circulations, the annular passageway 23 formed between the cylindrical inner wall of the pot 10 and the periphery of the vessel 22 is designed to be relatively narrow and of substantially lesser area than that of the top perforations of vessel 22 so as to force the circulation principally through the charge, and permit only a minor proportion thereof to pass through the said space 23. Moreover, small clearance results in promoting a substantial circulation through the mass of ground coffee beans within the vessel. Thus a faster brewing action is had which contributes to the efficiency of the pot.

The brewing may, however, also be conducted by an alternative arrangement by which the flow is caused to be directed in the opposite direction. That is to say, reference being had to FIG. 3 of the drawings, flow of the circulating water within a pot 40 is in a downward direction through the tubular termination 41 of the stem 42—the upper termination of said stem and pot not being shown, being substantially identical with the corresponding parts of the hereinbefore described embodiment and as shown and described in FIGURE 1.

Similarly, upper and lower cups 43, 44 are provided for, but their arrangement is somewhat modified. Thus, the lower cup 44, while perforated, does not support the charge directly but through an auxiliary and perforated plate 44' resting on said cup 44, as shown—the charge being indicated at 44". Also, the aforesaid flaring portion 17 of FIGURE 1 is to be reversely flared in this embodiment, as is indicated at 45; and the space 45' below the same then communicating with the annular passageway 47 provided about the cup assembly—the flow being as is indicated by the arrows.

A most important feature of this invention is described on both FIGURE 1 and FIGURE 3, the water circulation through the grounds as well as the forming brew, in both alternatives, is in a downward direction. This means that the roasted coffee grounds resting on both perforated plates 21 and 44', FIGURES 1 and 3 respectively, as the view progresses, they form a filtering agent for many particles that may get by the perforated plates 21 and 44'. As the brew progresses, the filtering action of the coffee grounds becomes more and more efficient with the ultimate result that a final clear brew is obtained. In the alternate shown on FIGURE 3, the clearance between cup 45 and container 40, is larger than the clearance between cups 45 and 44, this at their conical sections. Furthermore these passages join at 48, where the diameter of container 40 is reduced. The action of this design is to create a vetury effect by the flows that joint at 48. Flow from 45' will produce suction of flow at 49. This positively promotes a down water flow through the coffee grounds at 44.

I claim:

1. A pot for brewing coffee, comprising: A container for water and embodying a spout, handle and cover; a closed, annular, ground roasted coffee retaining vessel, the top and the bottom thereof being perforated; and means to support said vessel to immerse the same vertically in the container slightly displaced from the bottom thereof, said supporting means including a vertical tubular element fitting coaxially through the vessel, tightly fitting at the center of the ground roasted coffee retaining vessel, projecting above the upper part of the ground roasted coffee retaining vessel, the projecting portion thereof being perforated and a vertical rod forming integral part of the tubular element projecting vertically so as to be held centrally in position by the cover and said tubular element being supported by the bottom of the container.

2. A pot for brewing coffee according to claim 1 wherein said tubular element terminates at its lower end in an outwardly-flaring, conical cylindrical terminating extension and circulating guide resting upon the bottom of the container and is provided with a plurality of small openings through its cylindrical periphery.

3. A pot for brewing coffee, according to claim 2, where in large radially and small axially disposed openings are provided in the upper end of the tubular element externally of the coffee-retaining vessel.

4. A pot for the brewing of coffee, according to claim 3, wherein an annular narrow passageway is provided between periphery of the vessel and the adjacent surface of the wall of the container, the area of such passageway being less than that of the perforations of the top of the roasted coffee retaining vessel.

5. A pot for brewing coffee, according to claim 3, wherein a rod extending axially upward through the container and the cover is fixed to the top of said tubular element whereby the vessel may be inserted and removed from said container, and the top of the rod, at the cover, to be centrally guided by the cover by being of a smaller diameter than the lower portion and such change in diameter allowing the rod and ground roasted coffee container to be manually oscillated up and down.

6. A pot for brewing coffee, comprising a container for water and embodying a spout, handle and cover, a cylindrical vertical supporting rod with its upper end of smaller diameter and slidably fitting in the cover and projecting above the cover, the lower end of the rod supporting a coffee container structure is of a larger diameter than the upper end thereof and is of hollow construction, said hollow portion of the rod having radial openings so as to communicate, above and below the coffee container structure, the coffee container structure composed of four members: first a lower solid slightly upwardly conical plate of lesser outward diameter than the bottom of the container, second, an upward cup shaped member above the lower conical plate and having a flat perforated bottom, a cylindrical upper portion and intermediate conical section, third, a flat perforated coffee supporting plate resting at the point of change in shaped from cylindrical to conical of the second cup shaped member and centrally slidable fitting about the large hollow diameter of the centrally supporting rod, and fourth, an inverted cup shaped member with top perforations and slidably fitting about the cylindrical upper portion of the upward cup shaped member of lesser diameter than that of the lower part of the container and centrally fitting about the larger lower diameter of the vertical supporting rod.

7. A pot for brewing coffee, according to claim 6, and the lower part of the container of lesser diameter and of internal diameter about the same as the outer diameter of the inverted cup member.

8. A pot for brewing coffee, according to claim 7 and the clearance between the conical sections of the slightly conical member and the upward shaped member being less than the clearance between the slightly upwardly conical plate and the lower inner diameter of the container.

References Cited in the file of this patent
UNITED STATES PATENTS

| | | |
|---|---|---|
| 2,020,104 | Collin | Nov. 5, 1935 |
| 2,263,610 | Cain | Nov. 25, 1941 |
| 2,338,140 | States | Jan. 4, 1944 |
| 2,403,691 | States | July 9, 1946 |
| 2,562,433 | Moore | July 31, 1951 |
| 2,750,870 | Colonna | June 19, 1956 |